United States Patent
Kasaoki et al.

(10) Patent No.: US 9,904,860 B2
(45) Date of Patent: Feb. 27, 2018

(54) VEHICLE EXTERIOR ENVIRONMENT RECOGNITION APPARATUS

(71) Applicant: SUBARU CORPORATION, Tokyo (JP)

(72) Inventors: Seisuke Kasaoki, Tokyo (JP); Meguru Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/269,378

(22) Filed: Sep. 19, 2016

(65) Prior Publication Data

US 2017/0091566 A1     Mar. 30, 2017

(30) Foreign Application Priority Data

Sep. 24, 2015   (JP) .................................. 2015-186781

(51) Int. Cl.
*G06K 9/00* (2006.01)
*B60R 11/04* (2006.01)
(Continued)

(52) U.S. Cl.
CPC .......... *G06K 9/00825* (2013.01); *B60R 11/04* (2013.01); *G06T 7/70* (2017.01);
(Continued)

(58) Field of Classification Search
CPC .. H04N 5/2353; H04N 5/2351; H04N 5/2355; B60R 11/04; G06T 2207/30252;
(Continued)

(56) References Cited

U.S. PATENT DOCUMENTS

2013/0129150 A1*   5/2013  Saito .................... G06K 9/46
                                                            382/104
2013/0314568 A1*  11/2013  Vranceanu ........... H04N 5/2355
                                                            348/239
(Continued)

FOREIGN PATENT DOCUMENTS

JP     H11-203446 A     7/1999
JP        3349060 B2   11/2002
JP     2013-109391 A    6/2013

OTHER PUBLICATIONS

Kawai. "JP2004-320137A Document".*
Decision of Grant dated Mar. 21, 2017, issued in Japanese Patent Application No. 2015-186781. (w/ English translation).

*Primary Examiner* — Zhihan Zhou
(74) *Attorney, Agent, or Firm* — McDermott Will & Emery LLP

(57) ABSTRACT

A vehicle exterior environment recognition apparatus includes a computer configured to serve as a vehicle identifier, a candidate identifier, an overexposure identifier, a movement amount deriving unit, a moving overexposure identifier, an overexposure range setting unit, and a lamp determiner. The candidate identifier identifies a light-emission source candidate. The overexposure identifier identifies an overexposed light-emission source candidate. The movement amount deriving unit derives an amount of movement of the overexposed light-emission source candidate. The moving overexposure identifier identifies a moving overexposed light-emission source, when the amount of movement is equal to or greater than a threshold. The overexposure range setting unit sets an overexposure range with respect to the moving overexposed light-emission source. The lamp determiner determines whether the identified light-emission source candidate is a lighted lamp, based on different conditions between the light-emission source candidate in
(Continued)

the overexposure range and that in a range other than the overexposure range.

9 Claims, 9 Drawing Sheets

(51) Int. Cl.
    *H04N 5/235*     (2006.01)
    *G06T 7/70*     (2017.01)
    *G06T 7/90*     (2017.01)

(52) U.S. Cl.
    CPC ............. *G06T 7/90* (2017.01); *H04N 5/2351* (2013.01); *H04N 5/2353* (2013.01); *H04N 5/2355* (2013.01); *G06T 2207/10016* (2013.01); *G06T 2207/10024* (2013.01); *G06T 2207/30252* (2013.01)

(58) Field of Classification Search
    CPC . G06T 2207/10024; G06T 2207/10016; G06T 7/70; G06T 7/90; G06K 9/00825
    See application file for complete search history.

(56) References Cited

U.S. PATENT DOCUMENTS

2015/0117715 A1* 4/2015 Murao .................... G06K 9/38
                                                                382/104
2017/0141847 A1* 5/2017 De Bruijn ............ H04B 10/116

* cited by examiner

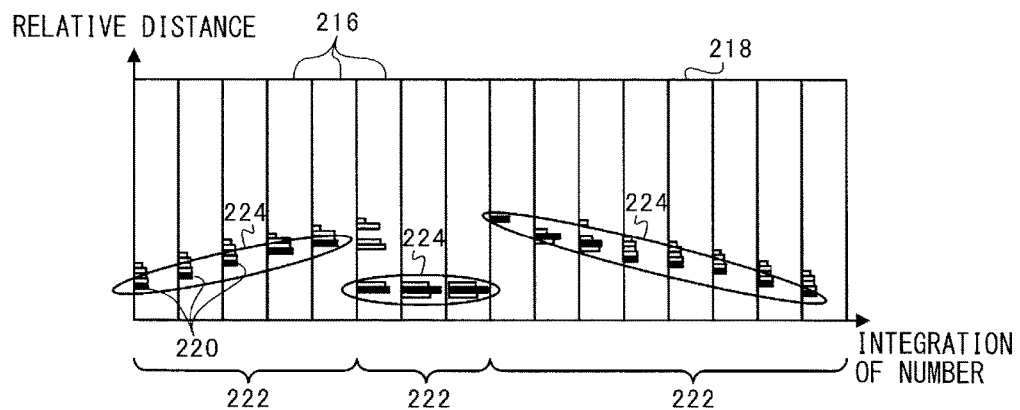
FIG. 5
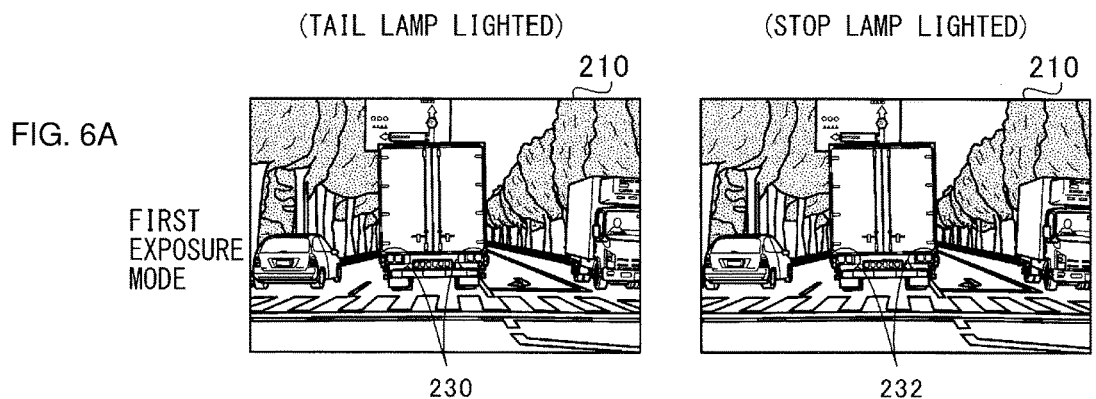
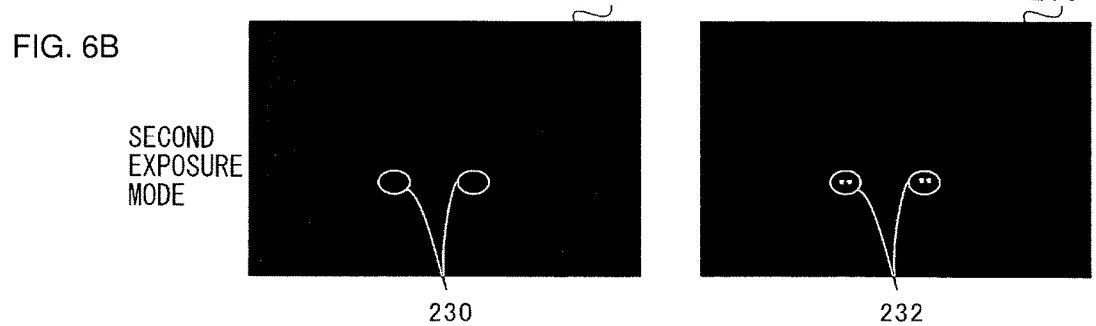
FIG. 6A
FIG. 6B

| COLOR | R | G | B |
|---|---|---|---|
| YELLOW (Y) | >150 | >R×24/32 | <R×14/32 |
| RED (R) | >150 | <R×24/32 | <R×14/32 |
| SLIGHTLY DARK RED AS COMPARED WITH RED (WR1) | >113 | <R×24/32 | <R×14/32 |
| EVEN DARKER RED (WR2) | >75 | <R×24/32 | <R×14/32 |
| DARKEST RED (WR3) | >9 | <R×24/32 | <R×14/32 |
| OVEREXPOSURE | >150 | >230 | >150 |

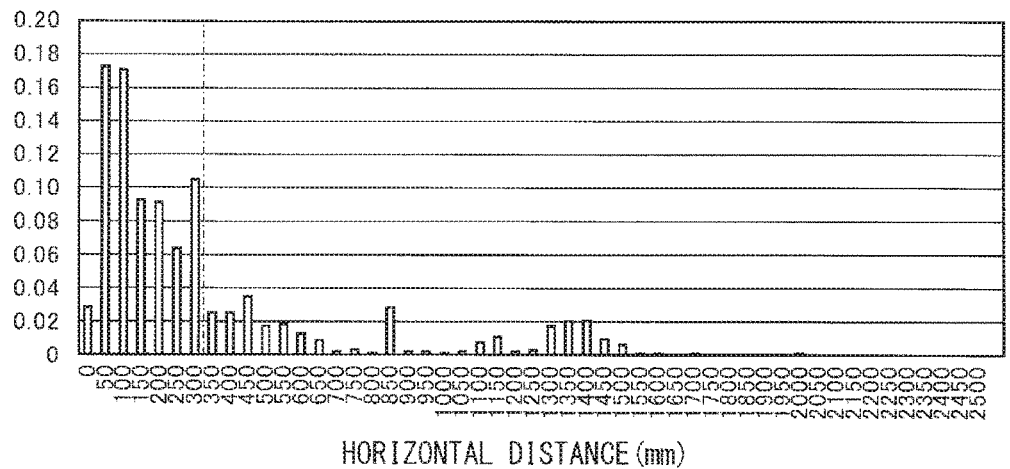

FIG. 10

| RELATIVE DISTANCE (m) | NON-OVEREXPOSURE RANGE | | OVEREXPOSURE RANGE | |
|---|---|---|---|---|
| | COLOR CONDITION | LIGHTED-STATE DETERMINATION THRESHOLD | COLOR CONDITION | LIGHTED-STATE DETERMINATION THRESHOLD |
| 0~40 | SECOND COLOR CONDITION | THL | SECOND COLOR CONDITION | THH |
| 40~60 | THIRD COLOR CONDITION | THL | SECOND COLOR CONDITION | THH |
| 60~80 | FOURTH COLOR CONDITION | THL | SECOND COLOR CONDITION | THH |
| 80~ | FIFTH COLOR CONDITION | THL | SECOND COLOR CONDITION | THH |

FIG. 11

VEHICLE EXTERIOR ENVIRONMENT RECOGNITION APPARATUS

CROSS-REFERENCE TO RELATED APPLICATIONS

The present application claims priority from Japanese Patent Application No. 2015-186781 filed on Sep. 24, 2015, the entire contents of which are hereby incorporated by reference.

BACKGROUND

The technology relates to a vehicle exterior environment recognition apparatus that identifies a lighted stop lamp of a preceding vehicle.

A technique has been proposed in which a three-dimensional object, such as a preceding vehicle located ahead of an own vehicle, is detected to perform a control that avoids collision with the preceding vehicle (i.e., a collision avoidance function) or to perform a control that keeps an inter-vehicular distance between the own vehicle and the preceding vehicle to a predetermined distance (i.e., an adaptive cruise control (ACC)). For example, reference is made to Japanese Patent No. 3349060. A smoother collision avoidance control or ACC is enabled by incorporating processes such as recognizing, for example, a presence of lighting of a lamp of the preceding vehicle and presuming a decelerating operation of the preceding vehicle. The presence of lighting may be, in other words, lighting or extinction. The lamp may be, for example but not limited to, a stop lamp.

As a technique that detects the presence of lighting of the stop lamp of the preceding vehicle, Japanese Unexamined Patent Application Publication (JP-A) No. 2013-109391 discloses a technique in which a threshold is changed in response to brightness of a vehicle exterior environment to determine the presence of lighting of the stop lamp. The threshold relates to a size of a light-emission source candidate that may be identified from an image captured by an image-capturing unit and may satisfy a predetermined luminance condition.

SUMMARY

Light such as sunlight may be reflected from a member of a preceding vehicle. The member may include, without limitation, a stop lamp cover and a rear window. When the sunlight is reflected, luminance of a section from which the sunlight is reflected may become high, in the image captured by the image-capturing unit. Under such circumstances, a condition related to the luminance of the light-emission source candidate remains unchanged regardless of the vehicle exterior environment in the technique disclosed in JP-A No. 2013-109391. Hence, there is room for improvement in that the section from which the sunlight is reflected may possibly be identified as the light-emission source candidate and thus the light-emission source candidate may possibly be identified as a lighted stop lamp.

To address this concern, one measure may be to determine the presence of lighting of a stop lamp, based on a change in luminance of the detected light-emission source candidate. This measure, however, may involve difficulties in determining the presence of lighting of the stop lamp promptly under a situation where information is not accumulated enough, such as, but not limited to, a situation immediately after the preceding vehicle is identified.

It is desirable to provide a vehicle exterior environment recognition apparatus that makes it possible to identify a lighted lamp promptly.

An aspect of the technology provides a vehicle exterior environment recognition apparatus that includes a computer configured to serve as a vehicle identifier, a candidate identifier, an overexposure identifier, a movement amount deriving unit, a moving overexposure identifier, an overexposure range setting unit, and a lamp determiner. The vehicle identifier identifies, from each of images captured continuously by an image-capturing unit, a preceding vehicle and a vehicle region occupied by the preceding vehicle. The candidate identifier identifies, as a light-emission source candidate, a candidate determinable as a light-emission source in the identified vehicle region. The overexposure identifier identifies, as an overexposed light-emission source, a section that satisfies a predetermined condition of overexposure in the identified vehicle region. The movement amount deriving unit derives an amount of movement, in a predetermined period of time, of the overexposed light-emission source with respect to the vehicle region. The moving overexposure identifier identifies the overexposed light-emission source as a moving overexposed light-emission source, when the amount of movement of the overexposed light-emission source is equal to or greater than a predetermined threshold of the amount of movement. The overexposure range setting unit sets, as an overexposure range, a predetermined range with respect to the moving overexposed light-emission source. The lamp determiner determines whether the identified light-emission source candidate is a lighted lamp, based on different conditions between the light-emission source candidate present in the overexposure range and the light-emission source candidate present in a range other than the overexposure range.

The lamp determiner may determine whether the identified light-emission source candidate present in the range other than the overexposure range is the lighted lamp, based on one of the number of pixels and area of pixels that satisfy a color condition of predetermined intensity. The lamp determiner may determine whether the identified light-emission source candidate present in the overexposure range is the lighted lamp, based on one of the number of pixels and area of pixels that satisfy a color condition of greater intensity than the color condition of the predetermined intensity.

The vehicle exterior environment recognition apparatus may further include a shape determiner. The shape determiner may derive a degree of circularity of the overexposed light-emission source identified by the overexposure identifier, and extract the overexposed light-emission source having the derived degree of circularity equal to or greater than a predetermined circularity threshold. The movement amount deriving unit may derive the amount of movement of the overexposed light-emission source extracted by the shape determiner.

The overexposure range setting unit may set the overexposure range that is vertically extended from the moving overexposed light-emission source serving as a center.

The computer is configured to further serve as an area converter. The area converter may count, with respect to the identified light-emission source candidate present in the range other than the overexposure range, the number of pixels that satisfies the color condition of the predetermined intensity, and converts, based on a relative distance from a preceding vehicle, the counted number of pixels to area. The area converter may count, with respect to the identified light-emission source candidate present in the overexposure range, the number of pixels that satisfies the color condition of the greater intensity than the color condition of the predetermined intensity, and converts, based on the relative distance from the preceding vehicle, the counted number of pixels to area. The lamp determiner may determine the identified light-emission source candidate is the lighted lamp, when the converted area is equal to or greater than a predetermined lighted-state determination threshold at which a lamp of the preceding vehicle is determined as lighted.

BRIEF DESCRIPTION OF THE DRAWINGS

FIG. 5 describes a process performed by the vehicle identifier.

FIGS. 6A and 6B describe a difference between image capturing performed based on a first exposure mode and image capturing performed based on a second exposure mode.

FIG. 10 describes a rate of emergence of a light-emission source candidate due to a section from which sunlight is reflected.

FIG. 11 summarizes color conditions and lighted-state determination thresholds with respect to the light-emission source candidates present in the overexposure range and a non-overexposure range.

DETAILED DESCRIPTION

Figure 1:
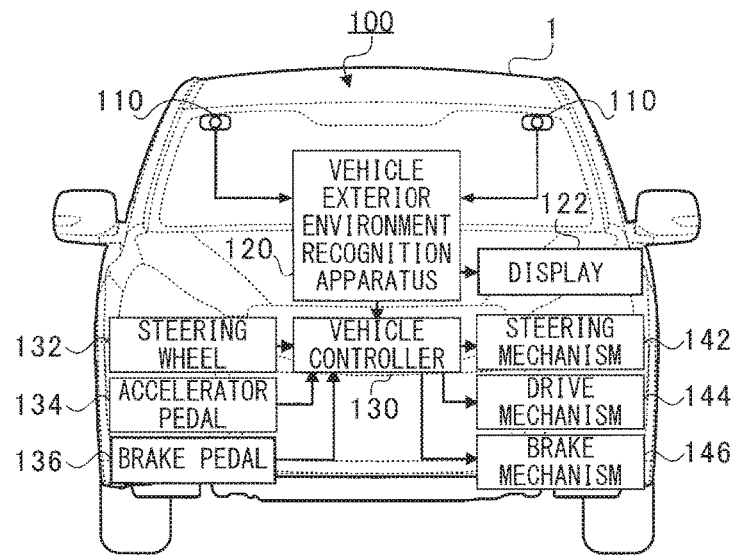
FIG. 1 is a block diagram illustrating a relation of connection in an environment recognition system.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Throughout the present specification and the drawings, elements having substantially the same function and configuration are denoted with the same reference numerals to avoid any redundant description. Further, elements that are not directly related to the technology are unillustrated in the drawings.

In recent years, there has been growing use of a vehicle having a collision prevention function and an adaptive cruise control (ACC). The collision prevention function may involve capturing an image of a road environment ahead of an own vehicle by a vehicle-mounted camera and identifying a three-dimensional object such as, but not limited to, a preceding vehicle, based on color information and position information in the captured image. By performing the identification, the collision prevention function may avoid collision with the identified three-dimensional object. The ACC may keep an inter-vehicular distance between the own vehicle and the preceding vehicle to a predetermined distance.

The collision prevention function and the ACC may, for example, derive a relative distance between the own vehicle and a three-dimensional object located ahead of the own vehicle. Based on the derived relative distance, the collision prevention function and the ACC may perform a control that avoids the collision with the three-dimensional object located ahead of the own vehicle, and when the three-dimensional object is a vehicle such as a preceding vehicle, may perform a control that keeps the relative distance between the own vehicle and the preceding vehicle to a predetermined distance.

An implementation of the technology combines the collision prevention function and the ACC with processes that recognize, for example, a lighted state (lighting or extinction) of a stop lamp of the preceding vehicle and presume a decelerating operation of the preceding vehicle to achieve a smoother cruise control and ACC. In the following, a description is given of an environment recognition system according to one implementation of the technology, and a vehicle exterior environment recognition apparatus as one of specific elements of the environment recognition system.

[Environment Recognition System 100]

FIG. 1 is a block diagram illustrating a relation of connection in an environment recognition system 100. The environment recognition system 100 may include image-capturing units 110, a vehicle exterior environment recognition apparatus 120, and a vehicle controller (e.g., an engine control unit (ECU)) 130 which are provided in an own vehicle 1. The implementation may include two image-capturing units 110 without limitation.

The image-capturing units 110 each may include an imaging device such as, but not limited to, a charge-coupled device (CCD) and a complementary metal-oxide semiconductor (CMOS). The image-capturing units 110 each may capture an image ahead of the own vehicle 1, and generate a color image expressed in color values. The color values may be a group of numerical values configured by one luminance (Y) and two color differences (UV), or a group of numerical values configured by three hues of red (R), green (G), and blue (B).

The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate image data for each frame of, for example but not limited to, 1/20 second (at a frame rate of 20 fps). The image data may be obtained as a result of the image capturing performed on a detection region ahead of the own vehicle 1. Identification objects to be discriminated from the image data generated by the image-capturing units 110 may include a three-dimensional object that is present independently, as well as an object identifiable as a part of the three-dimensional object. Non-limiting examples of the independently-present three-dimensional object may include a vehicle, a pedestrian, a traffic light, a road (or a traveling path), a guardrail, and a building. Non-limiting examples of the object identifiable as a part of the three-dimensional object may include a stop lamp, a high mount stop lamp, a tail lamp, a blinker, and each lighting part of the traffic light. The functional blocks to be described hereinafter according to this implementation may execute their respective processes for each frame, in response to update of the image data.

Further, in this implementation, the image-capturing units 110 each may perform, based on a first exposure mode, the image capturing of the detection region to generate a first image. The first exposure mode may involve exposure time and/or aperture that are based on brightness of a vehicle exterior environment, i.e., based on, for example but not limited to, a measurement result of an illuminometer. The image-capturing units 110 each may also generate a second image that allows for determination as to whether a particular light-emission source emits light. The particular light-emission source may be, for example but not limited to, the stop lamp. Non-limiting examples of a method of generating the second image may include: so performing image capturing as to prevent underexposure of a non-light-emitting three-dimensional object and overexposure of the light-emission source using a wide dynamic range imaging device; and performing image capturing of the detection region using a second exposure mode to generate the second image. The second exposure mode may be different in exposure mode, e.g., exposure time and/or aperture, from the first exposure mode. For example, during the daytime, the exposure time of the second exposure mode may be made shorter than the exposure time of the first exposure mode adapted to the bright vehicle exterior environment and/or the aperture of the second exposure mode may be made smaller than the aperture of the first exposure mode to generate the second image. In this implementation, without limitation, the first image and the second image each may be used as a color image. The first exposure mode and the second exposure mode may be achieved by any of the following example methods.

One method may be that the image-capturing units 110 each may perform the image capturing based on the first exposure mode and the image capturing based on the second exposure mode alternately by means of a time division of a periodic image-capturing timing, to thereby sequentially generate the first image and the second image. Another method may be that the image-capturing units 110 each may include an imaging device that has two capacitors for each pixel and allows for charging of electric charges in a parallel fashion for those two capacitors, and a time period during which the charging is performed by one exposure is varied between the two capacitors to thereby generate, in a parallel fashion, two images that are different in exposure mode from each other. Yet another method may be that the image-capturing units 110 each may read an image twice at different timing from each other while the charging of electric charges is performed on a single capacitor to thereby generate, in a parallel fashion, the two images that are different in exposure mode from each other. Still another method may be that the image-capturing units 110 each may include a set of image-capturing units that are different in exposure mode from each other (i.e., two sets of the two image-capturing units 110 in this implementation) to thereby generate an image from each of the two sets of the image-capturing units 110. The exposure time that plays a dominant role in each of the exposure modes may be controlled appropriately in a range from 1 millisecond to 60 milliseconds without limitation.

The vehicle exterior environment recognition apparatus 120 may obtain the image data from each of the two image-capturing units 110, and derive a parallax (i.e., an angular difference) from the obtained pieces of image data with use of so-called pattern matching. The vehicle exterior environment recognition apparatus 120 may then associate parallax information derived based on the parallax with the image data to thereby generate the distance image. The parallax information may be equivalent to three-dimensional position information to be described later in detail. A description on the color image and the distance image is given later in detail.

The vehicle exterior environment recognition apparatus 120 may use the color values based on the color image and the three-dimensional position information based on the distance image to perform grouping. The three-dimensional position information may be position information of a three-dimensional object in real space including a relative distance between the own vehicle 1 and the three-dimensional object. The vehicle exterior environment recognition apparatus 120 may perform the grouping of blocks, which are equal to each other in color values and close to each other in three-dimensional position information, as a single three-dimensional object. By performing the grouping, the vehicle exterior environment recognition apparatus 120 may identify which of the identification objects (e.g., the preceding vehicle) does the three-dimensional object in the detection region ahead of the own vehicle 1 correspond to. For example, the vehicle exterior environment recognition apparatus 120 may identify the preceding vehicle by means of information on the relative distance or any other information, and may further determine a position of a stop lamp of the preceding vehicle and a lighted state of the stop lamp by means of the color values. By performing the example processes described above, deceleration of the preceding vehicle is promptly sensed through the lighting of the stop lamp, making it possible to utilize information on the sensing (i.e., information on the deceleration of the preceding vehicle) for the collision prevention function and the ACC.

When the three-dimensional object is identified as a preceding vehicle, the vehicle exterior environment recognition apparatus 120 may derive factors such as, but not limited to, a relative speed and the relative distance with respect to the preceding vehicle while tracking the preceding vehicle to thereby determine whether a possibility of collision between the own vehicle 1 and the preceding vehicle is high. When a determination is made that the possibility of collision is high, the vehicle exterior environment recognition apparatus 120 may provide a driver with alerting display (i.e., notification) notifying the driver of the high possibility of collision, and may also output information on the high possibility of collision to the vehicle controller 130. The vehicle exterior environment recognition apparatus 120 may perform the alerting display by means of a display 122 disposed in front of the driver.

The vehicle controller 130 may control the own vehicle 1 by receiving information on an operation input of the driver through a steering wheel 132, an accelerator pedal 134, and a brake pedal 136 and sending the information on the operation input to a steering mechanism 142, a drive mechanism 144, and a brake mechanism 146. The vehicle controller 130 may control the steering mechanism 142, the drive mechanism 144 and the brake mechanism 146, in accordance with instructions from the vehicle exterior environment recognition apparatus 120.

In the following, a description is given in detail of a configuration of the vehicle exterior environment recognition apparatus 120. A description is given here in detail of an example configuration that may be one feature of this implementation. Note that a configuration less related to features of the implementation will not be described in detail.

[Vehicle Exterior Environment Recognition Apparatus 120]

Figure 2:
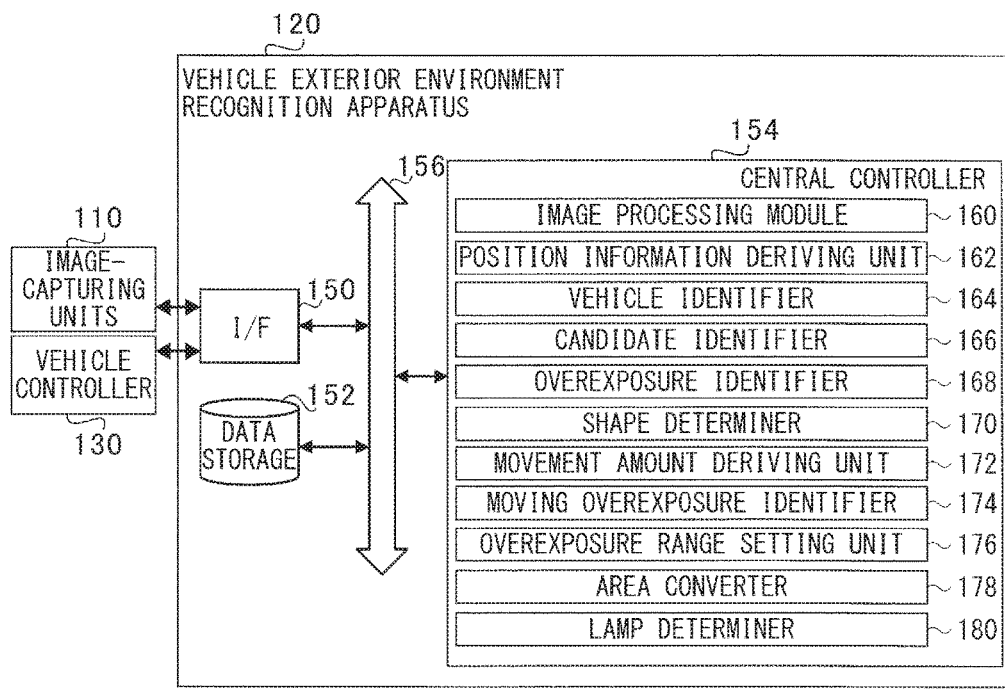
FIG. 2 is a functional block diagram illustrating schematic functions of a vehicle exterior environment recognition apparatus.

FIG. 2 is a functional block diagram illustrating schematic functions of the vehicle exterior environment recognition apparatus 120. Referring to FIG. 2, the vehicle exterior environment recognition apparatus 120 may include an interface (I/F) 150, a memory 152, and a central controller 154.

The interface 150 may exchange information bilaterally between devices including, without limitation, the image-capturing units 110 and the vehicle controller 130. The memory 152 may include a random access memory (RAM), a flash memory, a hard disk drive (HDD), or any other suitable storage device. The memory 152 may store various pieces of information necessary for processes to be carried out by the functional blocks to be described hereinafter, and temporarily hold the image data, i.e., the color image and the distance image which are based on the first image and the second image, received from the image-capturing units 110.

The central controller 154 may be a computer that includes a semiconductor integrated circuit, and may control devices including, without limitation, the interface 150 and the memory 152 through a system bus 156. The semiconductor integrated circuit may have devices such as, but not limited to, a central processing unit (CPU), a read only memory (ROM) in which programs, etc., are stored, and a random access memory (RAM) serving as a work area. In this implementation, the central controller 154 may function as an image processing module 160, a position information deriving unit 162, a vehicle identifier 164, a candidate identifier 166, an overexposure identifier 168, a shape determiner 170, a movement amount deriving unit 172, a moving overexposure identifier 174, an overexposure range setting unit 176, an area converter 178, and a lamp determiner 180. In the following, based upon an outline of objective of each of such functional blocks, a detailed operation of each of the functional blocks is described in the order of an image process, a vehicle identifying process, a light-emission source candidate identifying process, an overexposure range setting process, and a lamp determination process.

[Image Process]

The image processing module 160 may obtain the image data (i.e., the first image and the second image) of the color image from each of the two image-capturing units 110, and derive the parallax with use of the so-called pattern matching. The pattern matching may involve searching a block corresponding to any block extracted from one of the first images in the other of the first images. The block may be, for example but not limited to, an array of four horizontal pixels by four vertical pixels. The image processing module 160 may derive the parallax with use of the pattern matching for the second images as well. As used herein, the term "horizontal" refers to a lateral direction of a screen of the captured color image, and the term "vertical" refers to a vertical direction of the screen of the captured color image.

As the pattern matching, a luminance (i.e., a Y color-difference signal) may be compared, between the two images, per block that indicates any image position. Non-limiting examples of such a luminance comparison method may include SAD (Sum of Absolute Difference) that obtains luminance differences, SSD (Sum of Squared intensity Difference) that uses the squared differences, and NCC (Normalized Cross Correlation) that obtains similarity of variance obtained by subtracting an average luminance value from a luminance value of each pixel. The image processing module 160 may perform the foregoing parallax deriving process, performed on a block basis, for all of the blocks in the detection region. The detection region may be, for example but not limited to, an array of 600 horizontal pixels by 180 vertical pixels. In this implementation, each block may include the array of four horizontal pixels by four vertical pixels; however, any number of pixels may be set for each block.

The image processing module 160 derives the parallax per block, i.e., derives the parallax on a detection resolution basis. However, the image processing module 160 may have difficulties in recognizing the block in terms of which part of a three-dimensional object does that block belong to and in terms of a type of that three-dimensional object. Hence, the parallax information derived based on the parallax is derived independently on the detection resolution basis (e.g., on the block basis) with respect to the detection region, not on a three-dimensional object basis.

The position information deriving unit 162 may derive the three-dimensional position information with use of a so-called stereo method, based on the parallax derived by the image processing module 160 for each block (i.e., obtained for each part of the three-dimensional object) in the detection region. The three-dimensional position information may include pieces of information on a horizontal distance, a height, and the relative distance. The stereo method may involve deriving, from the parallax of any part of the three-dimensional object, the relative distance between that part of the three-dimensional object and the image-capturing units 110 with use a triangulation method. Upon deriving the three-dimensional position information, the position information deriving unit 162 may derive the height from a road surface of any part of the three-dimensional object, based on the relative distance between the own vehicle 1 (i.e., the image-capturing units 110) and the part of the three-dimensional object and based on a distance in the distance image from a point on the road surface to the part of the three-dimensional object. The point on the road surface is located at a position that is the same in relative distance as the part of the three-dimensional object. Note that an image in which the thus-derived parallax information (i.e., the three-dimensional position information) is associated with the image data is referred to as the distance image to distinguish the image from the color image described above.

Figure 3A:
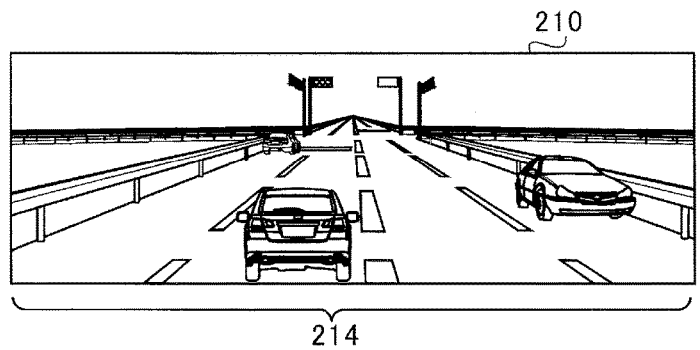
FIGS. 3A and 3B describe a color image and a distance image.
Figure 3B:
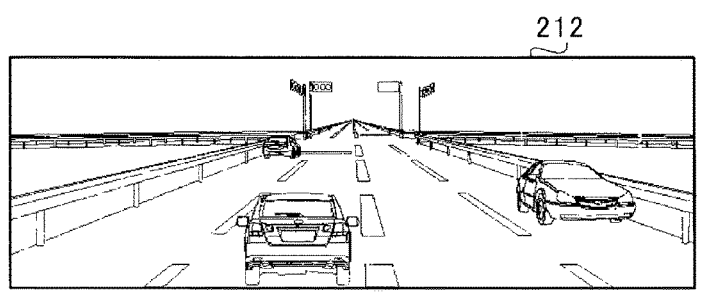

FIGS. 3A and 3B describes the color image 210 and the distance image 212. FIGS. 3A and 3B describes a non-limiting example in which the color image (i.e., the image data) 210 as illustrated in FIG. 3A is generated for the detection region 214 by means of the two image-capturing units 110. Note that FIG. 3A schematically illustrates only one of the two color images 210 for easier understanding. In this implementation, without limitation, the image processing module 160 may obtain the parallax for each part of the three-dimensional object from the color images 210, and the position information deriving unit 162 may derive, based on the obtained parallax, the three-dimensional position information for each part of the three-dimensional object, whereby the distance image 212 as illustrated in FIG. 3B may be formed. Each part of the three-dimensional object in the distance image 212 may be associated with the parallax information on the corresponding part of the three-dimensional object. For description purpose, each part of the three-dimensional object for which the parallax information is derived is denoted by a black dot. This implementation may generate the color images 210 and the distance images 212, based on the first image and the second image. Hence, this implementation may use the color image 210 based on the first image, the distance image 212 based on the first image, the color image 210 based on the second image, and the distance image 212 based on the second image.

[Vehicle Identifying Process]

Figure 4A:
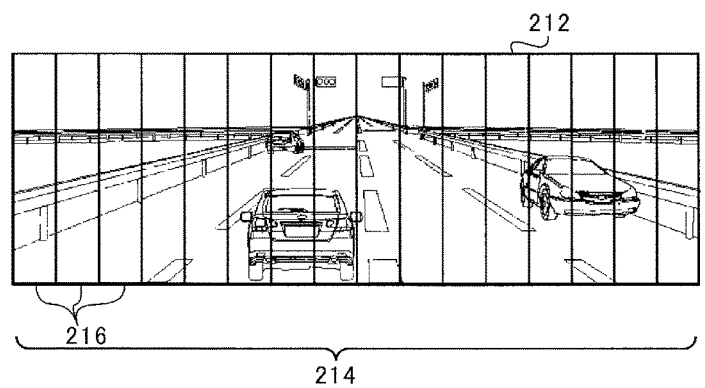
FIGS. 4A and 4B describe a process performed by a vehicle identifier.
Figure 4B:
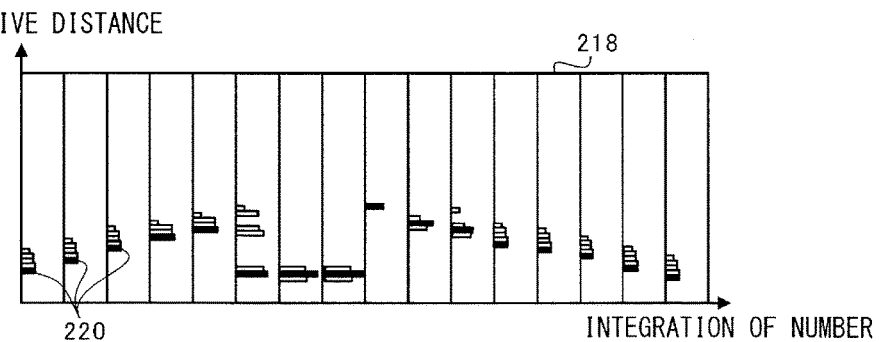

FIGS. 4A, 4B, and 5 each describe processes performed by the vehicle identifier 164. The vehicle identifier 164 may first divide the detection region 214 of the distance image 212 that is based on the first image into a plurality of divided regions 216 that are arrayed in a horizontal direction. The divided regions 216 each may thus have a strip shape as illustrated in FIG. 4A. Note that the strip-shaped divided regions 216 divided by the vehicle identifier 164 may be supposed to form, for example but not limited to, an array of 150 lines each having four pixels for a horizontal width. For description purpose, however, a description is given of an example in which the detection region 214 is divided into 16 divided regions 216.

The vehicle identifier 164 may then perform, for all of the blocks that are located above the road surface, integration of the number of (i.e., integration of frequency of) the relative distances included in each of segmented predetermined distances (i.e., distance segments). By performing the integration, the vehicle identifier 164 may generate, based on the position information (i.e., the three-dimensional position information derived by the position information deriving unit 162), histogram for each of the divided regions 216. As a result, a distance distribution 218 as illustrated in FIG. 4B may be obtained in which each histogram is denoted by a laterally-elongated quadrangle or bar. In FIG. 4B, a vertical direction denotes the segmented predetermined distances (i.e., distance segments), whereas a lateral direction denotes the number of blocks (i.e., frequency of blocks) that includes the relative distance for each of the distance segments. Note that FIG. 4B is a virtual screen used upon the calculation and does not involve generation of a visual screen in practice. The vehicle identifier 164 may refer to the thus-derived distance distribution 218 to identify a representative distance 220 (denoted by a black quadrangle in FIG. 4B). The representative distance 220 may be the relative distance that is equivalent to a peak. The wording "equivalent to peak" refers to a peak value, or a value that is close to peak and satisfies any condition.

The vehicle identifier 164 may then compare mutually-adjacent divided regions 216 with each other, and may perform grouping of the divided regions 216 in which their respective representative distances 220 are close to each other (e.g., located at a distance of one meter or less with respect to each other without limitation). By performing the grouping, the vehicle identifier 164 may generate one or more divided region groups 222 as illustrated in FIG. 5. In a situation where the three or more divided regions 216 are close to each other in representative distance 220, the vehicle identifier 164 may put all of such continuous divided regions 216 together as the divided region group 222. By performing the grouping, the vehicle identifier 164 may allow for identification of any three-dimensional object located above the road surface.

The vehicle identifier 164 may then perform grouping of blocks in the divided region group 222, based on a block, as the origin, in which the relative distance is equivalent to the representative distance 220. More specifically, the vehicle identifier 164 may perform the grouping of the originating block and any block in which differences each fall within a predetermined range from the originating block, on the assumption that those blocks correspond to the same identification object. The differences may include the difference in the horizontal distance, the difference in height, and the difference in the relative distance, with respect to the originating block. The predetermined range may be, for example but not limited to, 0.1 meters. In this manner, a three-dimensional object 224 as a virtual block group may be generated. The foregoing range may be expressed by a distance in real space, and may be set to any value by, for example but not limited to, a manufacturer or a person riding on the vehicle. The vehicle identifier 164 may further perform the grouping of any block newly added by the grouping as well, based on the newly-added block as the origin. More specifically, the vehicle identifier 164 may further perform the grouping of the originating newly-added block and any block in which the differences, including the difference in the horizontal distance, the difference in height, and the difference in the relative distance, each fall within the predetermined range from the originating newly-added block. In other words, all of the groups assumable as the same identification object are grouped by the grouping accordingly.

In this implementation, the difference in the horizontal distance, the difference in height, and the difference in the relative distance are each independently determined, and the blocks are identified as belonging to the same group only when all of the differences fall within the predetermined range. However, any other calculation may be employed to identify that the blocks belong to the same group. For example, the blocks may be identified as belonging to the same group when the root mean square of the difference in the horizontal distance, the difference in height, and the difference in the relative distance expressed by $\sqrt{((\text{horizontal distance difference})^2+(\text{height difference})^2+(\text{relative distance difference}))}$ falls within a predetermined range. Such a calculation allows for derivation of accurate distances in the real space between the blocks, making it possible to increase an accuracy of the grouping.

When the grouped three-dimensional object 224 satisfies a predetermined condition corresponding to a predefined vehicle, the vehicle identifier 164 may then decide that the three-dimensional object 224 is the identification object "vehicle". For example, when the grouped three-dimensional object 224 is located on a road, the vehicle identifier 164 may make a determination as to whether a size of that three-dimensional object 224 as a whole is equivalent to a size of the identification object "vehicle". When the size of the three-dimensional object 224 as a whole is determined as being equivalent to the size of the identification object "vehicle", the vehicle identifier 164 may identify the three-dimensional object 224 as the identification object "vehicle". The vehicle identifier 164 may also identify, as a vehicle region, a rectangular region in which the three-dimensional object 224 identified as the identification object "vehicle" occupies in the screen.

In this manner, the vehicle exterior environment recognition apparatus 120 allows for extraction of one or more three-dimensional objects 224 as the identification object such as, but not limited to, the vehicle (e.g., the preceding vehicle) from the distance image 212 as the first image, making it possible to use information on the extraction for various controls. For example, when any three-dimensional object 224 in the detection region 214 is identified as the vehicle, it is possible to perform a control that tracks the identified vehicle (e.g., the preceding vehicle) and detects factors including a relative distance and relative acceleration to avoid collision between the own vehicle 1 and the preceding vehicle or to keep an inter-vehicular distance between the own vehicle 1 and the preceding vehicle to a safe distance. In order to perform such identification of the preceding vehicle and sensing of a behavior of the preceding vehicle further promptly, the lighted stop lamp may be determined from light-emission source candidates that are located in the vehicle region as described below.

[Light-Emission Source Candidate Identifying Process]

It is to be noted that the second image is captured based on the second exposure mode that allows for, for example but not limited to, discrimination of a particular light-emission source. In this implementation, without limitation, the light-emission source is the stop lamp in the lighted state. A device that emits light by itself, as with the stop lamp, makes it possible to obtain the high color values regardless of brightness of the sun and a street light. In particular, brightness of the stop lamp upon lighting is generally regulated by regulations, meaning that performing the image capturing with use of the exposure mode that only allows for exposure based on predetermined brightness (e.g., short-time exposure) makes it possible to easily extract only the pixels that are equivalent to the stop lamp.

FIGS. 6A and 6B describe a difference between the image capturing performed based on the first exposure mode and the image capturing performed based on the second exposure mode. FIG. 6A illustrates the color images 210 each of which is based on the first image captured by the first exposure mode. In particular, the left illustration in FIG. 6A illustrates an example where a tail lamp is lighted, whereas the right illustration in FIG. 6A illustrates an example where both a stop lamp and the tail lamp are lighted. As can be appreciated from FIG. 6A, the first exposure mode that is based on the brightness of the vehicle exterior environment hardly produces a difference between the color values at a tail lamp position 230 in which the stop lamp is unlighted and the tail lamp is lighted and the color values at a stop lamp position 232 in which both the stop lamp and the tail lamp are lighted. One reason is that the first exposure mode involves long exposure time and thus results in saturation of the color values for all of the RGB components with respect to both the tail lamp and the stop lamp.

FIG. 6B illustrates the color images 210 each of which is based on the second image captured by the second exposure mode. In particular, the left illustration in FIG. 6B illustrates an example where the tail lamp is lighted, whereas the right illustration in FIG. 6B illustrates an example where both the stop lamp and the tail lamp are lighted. The second exposure mode may be so set that only the color values upon the lighting of the stop lamp are obtainable. Hence, as can be appreciated from the left illustration in FIG. 6B, the second exposure mode hardly obtains the color values that are based on brightness of the tail lamp for the tail lamp position 230 even when the tail lamp is lighted. In contrast, as can be appreciated from the right illustration in FIG. 6B, the second exposure mode successfully obtains the distinctly-high color values for the stop lamp position 232 in which the stop lamp is lighted.

The second exposure mode may be so set as to have the exposure time that causes the R component as a color value of the stop lamp to be on the verge of being saturated or not in the imaging device. In general, the image-capturing units 110 each have a dynamic range significantly narrower than that of humans, meaning that the color values of the stop lamp increases relatively as compared with the vehicle exterior environment when the image capturing is performed based on the first exposure mode under a low-lightness environment such as the early evening. In this case, not only the R component but also the G component and the B component are saturated to their maximum values (e.g., the color values have values of 255) due to the overlapping of the G and the B components with the R component, thereby causing pixels to be white. To address this concern, the second exposure mode may be set to have the exposure time by which the R component is on the verge of being saturated or not upon the lighting of the stop lamp. This makes it possible to extract only the R component at the maximum value while suppressing an influence on the color values for the G and the B components regardless of the environment outside the vehicle. In other words, for example, this makes it possible to ensure a difference in color value between the stop lamp and the tail lamp to the maximum accordingly.

In one specific but non-limiting example where the preceding vehicle is present upon traveling during the evening, when the second exposure mode is so set that the lighted stop lamp satisfies a color range (R) of "200 or greater", the lighted tail lamp may appear on the color image 210 that is based on the second image, for example, with the color range (R) of about "50", a color range (G) of about "50", and a color range (B) of about "50". In contrast, the lighted stop lamp may appear on the color image 210 that is based on the second image, for example, with the color range (R) of "200 or greater", the color range (G) of "50 or less", and the color range (B) of "50 or less". In this manner, it is possible for the candidate identifier 166 to identify the lighted stop lamp by means of the color image 210 that is based on the second image. In the following, a description is given of the light-emission source candidate identifying process that identifies, as light-emission source candidates, candidates determinable as light-emission sources including the lighted stop lamp from the color image 210 that is based on the second image.

Figures 7, 8:
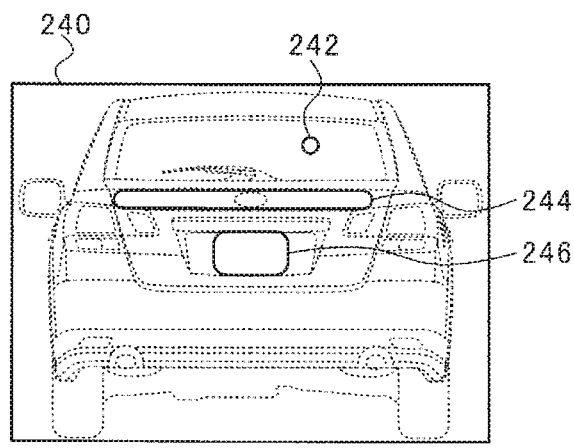
FIG. 7 describes color thresholds.
FIG. 8 describes shapes of overexposed light-emission sources varying with positions of reflection from a preceding vehicle.

FIG. 7 describes color thresholds. As the color thresholds for identification of the lighted stop lamp from the color image 210 that is based on the second image, the implementation may include, without limitation, five levels of color thresholds, namely, "yellow (Y)", "red (R)", "slightly dark red as compared with red (WR1)", "even darker red (WR2)", and "darkest red (WR3)" as illustrated in FIG. 7. The implementation may also include, without limitation, a color threshold "overexposure", as an overexposure threshold for identification of an overexposed light-emission candidate, details of which is described later. In this implementation, without limitation, a standard shutter speed in the second exposure mode may be set to 17 milliseconds. The implementation may also employ, with an exception, a plurality of color conditions each of which is based on the color thresholds, rather than using the plurality of such color thresholds directly. The color conditions may include, without limitation, five levels of color conditions, namely: "yellow" (hereinafter simply referred to as a "first color condition"); "yellow" plus "red" (hereinafter simply referred to as a "second color condition"); "yellow" plus "red" plus "slightly dark red as compared with red" (hereinafter simply referred to as a "third color condition"); "yellow" plus "red" plus "slightly dark red as compared with red" plus "even darker red" (hereinafter simply referred to as a "fourth color condition"); and "yellow" plus "red" plus "slightly dark red as compared with red" plus "even darker red" plus "darkest red" (hereinafter simply referred to as a "fifth color condition"). One reason why each of the second to the fifth conditions is based on the sum of any color threshold and any other color threshold having higher intensity (the lightness) than that color threshold is to appropriately determine a region having a higher intensity than any of the predetermined color thresholds.

The candidate identifier 166 may obtain, on a pixel basis, the color values based on three hues of R, G, and B from a region corresponding to the vehicle region of the color image 210 that is based on the second image. Further, the candidate identifier 166 may identify pixels in which the color values satisfy the fifth color condition, i.e., identify the pixels that involve the color values corresponding to the "darkest red", or higher. One reason for this is that the pixels that involve at least the color values corresponding to the "darkest red" possibly belong to the lighted stop light captured by the image capturing. Note that, when the detection region 214 is in, for example but not limited to, rainy or cloudy weather, the candidate identifier 166 may obtain the color values after adjustment of white balance so as to obtain original color values.

When the difference in the horizontal distance, the difference in height, and the difference in the relative distance between the pixels, identified as satisfying the fifth color condition, each fall within a predetermined range, the candidate identifier 166 may perform grouping of the identified plurality of pixels as a single light-emission source candidate. The predetermined range may be, for example but not limited to, 0.1 meters. In this manner, even when the pixels constituting the stop lamp are present across multiple regions, or even when the stop lamps located on right and left sides of the vehicle are each constituted by a plurality of lamps, the candidate identifier 166 makes it possible to individually recognize those pixels as belonging to one of the stop lamps that are present on right and left sides of the vehicle.

[Overexposure Range Setting Process]

Here, depending on the exterior environment such as a sunshine condition, light such as the sunlight or streetlamp light may be reflected from a body, a number plate, a stop lamp cover, a rear window, or other vehicle parts. This causes an increase in the color value of a section from which the light is reflected in the second image. Simply comparing the color value of the identified light-emission candidate with a fixed threshold may therefore cause possibility of erroneous determination of the section from which the light is reflected, as a lighted stop lamp. For instance, although the stop lamp is unlighted, the color value of the section from which the sunlight is reflected may become higher than the fixed threshold, causing the possibility of erroneous determination that the stop lamp is lighted.

In particular, in the exterior environment where the sunlight is reflected from the preceding vehicle, the color value of the section from which the sunlight is reflected in the second image may become high. Accordingly, this implementation may involve setting of an overexposure range from which the sunlight is considered to be reflected. The term "overexposure range" refers to an overexposed section from which the sunlight is reflected to cause overexposure, and a section in vicinity of the overexposed section. A threshold with respect to the overexposure range thus set may be set as a higher value than a threshold with respect to a non-overexposure range from which the sunlight is considered not to be reflected, to increase accuracy in detection of the lighted stop lamp. Note that the term "overexposure" as used here refers to a pixel or a pixel group, in the second image, that is saturated to be white or a color close to white.

In one specific but non-limiting implementation, the overexposure identifier 168 may extract, from pixels in the vehicle region, pixels that satisfy a condition of overexposure, i.e., pixels in which the color values are equal to or greater than the overexposure color threshold (refer to FIG. 7). The overexposure identifier 168 may perform grouping of the extracted plurality of pixels when the difference in the horizontal distance, the difference in the height, and the difference in the relative distance between the extracted pixels each fall within a predetermined range of, for example but not limited to, 0.1 meters. Thereafter, the overexposure identifier 168 may identify a pixel group thus grouped, as an overexposed light-emission source. Note that the overexposure color threshold may be set as a color value considered as saturated in the second image. In other words, the overexposed light-emission source is highly likely to be a pixel group (or a section) saturated by the sunlight in the second image. In one alternative implementation, the overexposure identifier 168 may identify, as the overexposed light-emission source, the light-emission source candidate that includes a pixel having a color value equal to or greater than the overexposure color threshold, out of the identified light-emission source candidates.

FIG. 8 illustrates shapes of the overexposed light-emission sources varying with positions of reflection from the preceding vehicle. As illustrated in FIG. 8, in the vehicle region 240, the overexposed light-emission source 242 in which the sunlight is reflected from the rear window may be in a substantially circular shape, because the rear window has a curved surface. Meanwhile, in many cases, the overexposed light-emission source 244 in which the sunlight is reflected from the body, and the overexposed light-emission source 246 in which the sunlight is reflected from the number plate may be in horizontally elongated shapes due to irregular reflection of the sunlight. This may be because the body and the number plate are substantially planar in a widthwise direction, and have complicated shapes.

Thus, the overexposed light-emission source 244 in which the sunlight is reflected from the body, and the overexposed light-emission source 246 in which the sunlight is reflected from the number plate may be affected by the complicated shapes of the body and the number plate. This may result in difficulty in identifying, in the vehicle region 240, the overexposure range from which the sunlight is considered to be reflected.

To address this difficulty, the shape determiner 170 may derive a degree of circularity of the overexposed light-emission source identified by the overexposure identifier 168, and extract solely the overexposed light-emission source whose degree of circularity thus derived is equal to or greater than a circularity threshold. The circularity threshold may be a threshold at which the reflection from the rear window is considered to occur. Here, the degree of circularity may be derived as follows: ((area of the overexposed light-emission source)×4π)/(a length of an outline that surrounds the overexposed light-emission source)$^2$. The circularity threshold may be set as 0.7 (70%). In this way, based on the shape of the overexposed light-emission source, the circular overexposed light-emission source having a nearly circular shape may be identified as the light-emission source overexposed due to the reflection of the sunlight.

Moreover, in the second image, the lighted stop lamp may be constantly in same positional relation to the vehicle region 240, while the section whose color value is increased due to the reflection of the sunlight may change depending on positional relation of the sun to the preceding vehicle and the own vehicle 1.

Accordingly, when the circular overexposed light-emission source is identified, the movement amount deriving unit 172 may track the circular overexposed light-emission source, and derive an amount of movement of the circular overexposed light-emission source. In one specific but non-limiting implementation, the movement amount deriving unit 172 may derive, with respect to each of the circular overexposed light-emission sources in the second image obtained this time, a coordinate difference (di, dj) in the horizontal and vertical directions between a center coordinate (iKc, jKc) of the circular overexposed light-emission source in the second image obtained this time and a center coordinate (iTc, jTc) of the one or more circular overexposed light-emission sources in the second images obtained last time or last time but one. Note that, with respect to the circular overexposed light-emission source in the second image obtained last time but one, the movement amount deriving unit 172 may use solely the circular overexposed light-emission source that is not associated with the circular overexposed light-emission source in the second image obtained last time. In other words, the movement amount deriving unit 172 may use solely the circular overexposed light-emission source that has not been tracked. One reason for this may be as follows. When the circular overexposed light-emission source in the second image obtained last time but one is associated with the circular overexposed light-emission source in the second image obtained last time, the tracking may be made with use of the circular overexposed light-emission source in the second image obtained last time. The center coordinate (iKc, jKc) and the center coordinate (iTc, jTc) may be pixel positions in the horizontal and vertical directions from a predetermined origin position, in the second image.

Thereafter, the movement amount deriving unit 172 may associate the circular overexposed light-emission source in the second image obtained this time, with the circular overexposed light-emission source in the second image obtained last time or last time but one, to make a combination. The circular overexposed light-emission source in the second image obtained this time may have the coordinate difference (di, dj) in the horizontal and vertical directions being equal to or smaller than the predetermined threshold (Tri, Trj), and a sum (di+dj) of the horizontal coordinate difference di and the vertical coordinate difference dj being a minimum. Note that the threshold Tri may be set as the number of pixels that is equivalent to, for example but not limited to, 50 centimeters. The threshold Trj may be set as the number of pixels three times as many as that of the threshold Tri (i.e., the number of pixels that is equivalent to 150 centimeters).

Moreover, out of the circular overexposed light-emission sources in the second image obtained this time, with respect to the circular overexposed light-emission source that is not associated with the circular overexposed light-emission source in the second image obtained last time or last time but one, the movement amount deriving unit 172 may consider the relevant circular overexposed light-emission source as the newly-spotted circular overexposed light-emission source (that has no tracking source).

Furthermore, out of the circular overexposed light-emission source in the second image obtained last time but one, with respect to the circular overexposed light-emission source that is not associated with the circular overexposed light-emission source in the second images obtained last time and this time, the movement amount deriving unit 172 may consider the tracking to have ceased, and finish the tracking of the relevant circular overexposed light-emission source.

Thereafter, out of the circular overexposed light-emission source in the second image obtained this time, with respect to the circular overexposed light-emission source that is associated with the circular overexposed light-emission source in the second image obtained last time or last time but one, the movement amount deriving unit 172 may derive a three-dimensional position (xTi (t), yTi (t), zTi(t)) of the center of a rectangular section that surrounds the circular overexposed light-emission source, based on the parallax information derived by the position information deriving unit 162. The movement amount deriving unit 172 may also derive a three-dimensional position (xCi (t), yCi (t), zCi (t)) of the center of the vehicle region 240, based on the parallax information derived by the position information deriving unit 162.

Thereafter, the movement amount deriving unit 172 may derive an amount of horizontal deviation dxi(t)=xCi(t)−xTi (t) of the circular overexposed light-emission source with respect to the center of the vehicle region 240. The movement amount deriving unit 172 may also derive an integration value of the amount of deviation dxi(t) of the circular overexposed light-emission source of which the tracking has been started, i.e., the amount of movement Σddxi(t).

Thereafter, the overexposure range setting unit 176 may identify the circular overexposed light-emission source as a light-emission source caused by the reflection of the sunlight, when the amount of movement of the relevant circular overexposed light-emission source is equal to or greater than a predetermined threshold of the amount of movement. The threshold of the amount of movement may be set as, for example but not limited to, 50 centimeters. Hereinafter, the light-emission source caused by the reflection of the sunlight may be also referred to as a moving overexposed light-emission source. The overexposure range setting unit 176 may set the overexposure range, in vicinity of the moving overexposed light-emission source. The overexposure range may be a range in which the color value is considered to be increased due to the reflection of the sunlight.

Figure 9A:
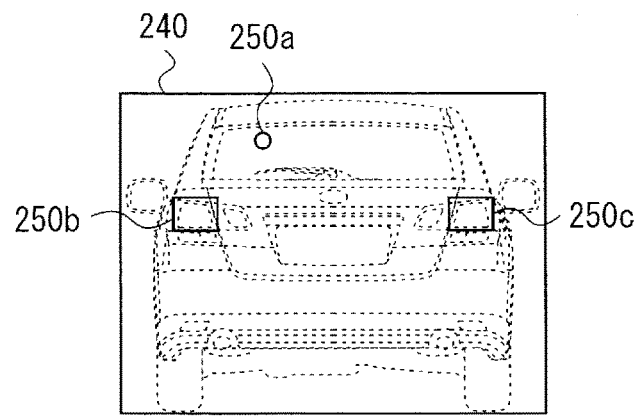
FIGS. 9A-9D describe an overexposure range.
Figure 9B:
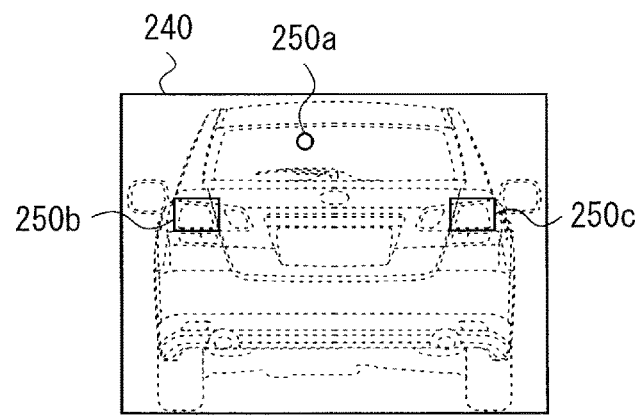
Figure 9C:
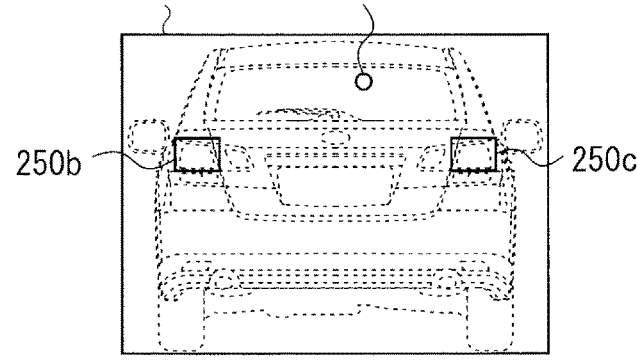

FIGS. 9A-9D illustrate the overexposure range 252. FIG. 10 illustrates a rate of emergence of the light-emission source candidates due to the reflection of the sunlight. In one specific but non-limiting implementation, as illustrated in FIG. 9A, assume that the three light-emission source candidates 250a, 250b, and 250c are identified in the vehicle region 240, and the light-emission source candidate 250a is identified as the circular overexposed light-emission source. Also, as illustrated in FIGS. 9B-9C, assume that the light-emission source candidate 250a (the circular overexposed light-emission source) moves (among a plurality of frames) as time passes, and the light-emission source candidate 250a is identified as the moving overexposed light-emission source.

Figure 9D:
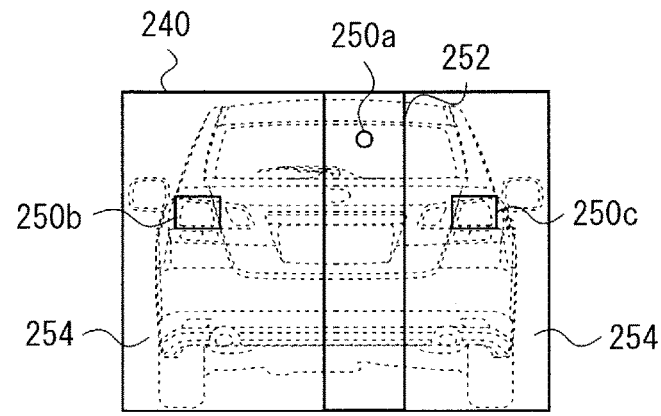

In this case, as illustrated in FIG. 9D, the overexposure range setting unit 176 may provide setting of an overexposure range 252. The overexposure range 252 may be a range that is vertically extended with a predetermined width, with a horizontal center of the light-emission source candidate (the moving overexposed light-emission source) 250a serving as a reference. Also, the overexposure range setting unit 176 may set, as a non-overexposure range 254, a range other than the overexposure range 252, in the vehicle region 240. The non-overexposure range 254 may be a range considered as unaffected by the reflection of the sunlight.

Here, referring to FIG. 10, it was proved by experiments that the light-emission sources identified due to the reflection of the sunlight emerged at a high rate within a range of 300 millimeters or less horizontally, but at an extremely low rate in a range of more than 300 millimeters or more horizontally, from the horizontal center of the moving overexposed light-emission source serving as the reference. One reason for this may be because many vehicles have their rear surfaces curved in the widthwise direction, and a curvature of the curve is not much changed in a heightwise direction. The overexposure range setting unit 176 may therefore sets the overexposure range 252 that is vertically extended with a width of ±300 millimeters horizontally in the vehicle region 240, with the horizontal center of the light-emission source candidate (the moving overexposed light-emission source) 250*a* serving as the reference.

In the following, a description is given on a lamp determination process. In the lamp determination process, the color conditions and the lighted-state thresholds are allowed to be different between the overexposure range 252 and the non-overexposure range 254. The color conditions and the lighted-state determination thresholds may be used in determining whether or not the light-emission source candidate present in the vehicle region 240 is the lighted stop lamp. A detailed description of the lighted-state determination thresholds is given below.

[Lamp Determination Process]

FIG. 11 summarizes the color conditions and the lighted-state determination thresholds with respect to the light-emission source candidates present in the overexposure range 252 and the non-overexposure range 254. As described later in detail, the area converter 178 may convert the number of pixels of the light-emission source candidate to area with use of the color conditions summarized in FIG. 11. The lamp determiner 180 may determine, with use of the lighted-state determination thresholds, whether or not the light-emission source candidate present in the vehicle region 240 is the lighted stop lamp.

As illustrated in FIG. 11, in the non-overexposure range 254, the color conditions are different in accordance with the relative distance from the preceding vehicle. One reason for this may be as follows. As the relative distance becomes longer, the color value of the stop lamp captured in the second image may become smaller. Accordingly, the lighted-state determination threshold that may serve as the color condition may be lowered as the relative distance becomes longer, to prevent the lighted stop lamp from being erroneously determined as unlighted depending on the color conditions.

In this implementation, the color condition of the non-overexposure range 254 may be set as the second color condition when the relative distance is equal to or greater than 0 (zero) meter but less than 40 meters, as the third color condition when the relative distance is equal to or greater than 40 meters but less than 60 meters, as the fourth color condition when the relative distance is equal to or greater than 60 meters but less than 80 meters, and as the fifth color condition when the relative distance is equal to or greater than 80 meters. The lighted-state determination threshold of the non-overexposure range 254 may be set as a lighted-state determination threshold THL, which is described later in detail.

Meanwhile, the color condition of the overexposure range 252 may be set as the second color condition regardless of the relative distance, because the reflection of the sunlight is highly likely to cause the high color value. The lighted-state determination threshold of the overexposure range 252 may be set as a threshold of lighting determination THH that is higher than the lighted-state determination threshold THL.

It is to be noted that the light-emission source candidate that satisfies the color condition may become small in size and may thus become small in the number of pixels to be grouped as the light-emission source candidate when the relative distance between the own vehicle 1 and the preceding vehicle is long. In contrast, when the relative distance between the own vehicle 1 and the preceding vehicle is short, the light-emission source candidate that satisfies the color condition may become large in size and may thus become large in the number of pixels to be grouped as the light-emission source candidate accordingly. Hence, the number of pixels that satisfies the color condition may vary depending on a variation in the relative distance between the own vehicle 1 and the preceding vehicle even when the stop lamp keeps its lighted state. If the variation occurs in the number of pixels that satisfies the color condition depending on a positional relationship between the own vehicle 1 and the preceding vehicle even though the stop lamp is lighted, the following example concern may possibly arise consequently. One concern is that, even when the stop lamp is lighted and thus the pixels that are supposed to satisfy the color condition are present, the number of pixels that satisfies that color condition may not satisfy the threshold as a result of the variation in the number of pixels attributable to the excessively-long relative distance. To address this concern, the implementation may convert the number of pixels that satisfies the color condition into actual area, based on the relative distance between the own vehicle 1 and the preceding vehicle.

Figure 12:
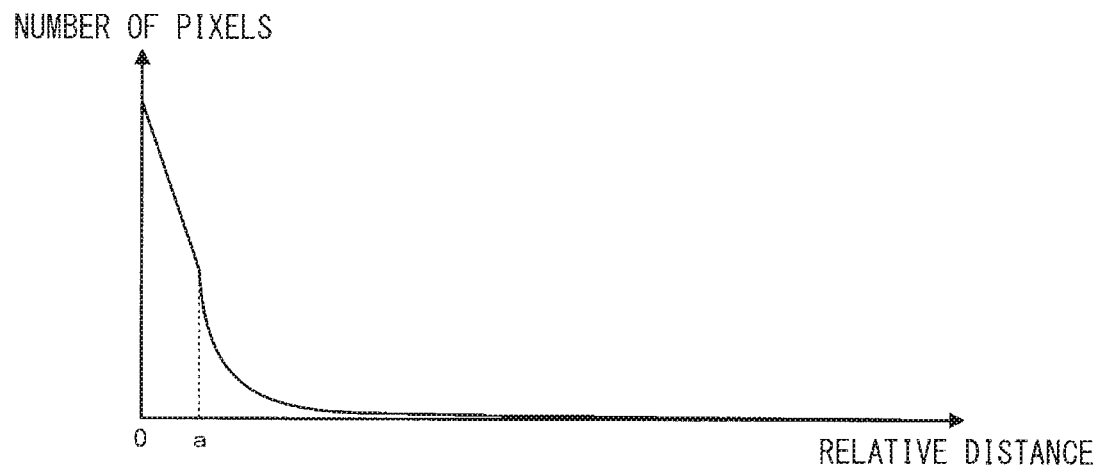
FIG. 12 describes a relationship of a relative distance between an own vehicle and the preceding vehicle versus the number of pixels.

FIG. 12 describes a relationship of the relative distance between the own vehicle 1 and the preceding vehicle versus the number of pixels. In FIG. 12, a horizontal axis denotes the relative distance, whereas a vertical axis denotes the number of pixels which a three-dimensional object having a predetermined size occupies. As can be appreciated from FIG. 12, the number of pixels becomes smaller as the relative distance becomes longer even for the same three-dimensional object, i.e., the same area. Such a change in the number of pixels may be approximated by a function, in which the number of pixels may be proportional to the relative distance from a point where the relative distance is 0 (zero) to a point "a" of the relative distance in FIG. 12. Past the point "a", the number of pixels may be proportional to the 3/2 power of the relative distance. In general, a size of a three-dimensional object in an image is simply proportional to the relative distance. In a case of a light-emission source, however, an apparent light-emission region spreads due to an influence of light emission, thereby causing the relationship between the relative distance and the number of pixels to be non-linear as illustrated in FIG. 12.

Hence, the area converter 178 may count the number of pixels that satisfies the color condition (refer to FIG. 11) set based on the relative distance from the preceding vehicle, and convert, based on an inverse function illustrated in FIG. 12 (i.e., division of the relative distance between the own vehicle 1 and the preceding vehicle by the number of pixels in FIG. 12), the number of pixels that satisfies the color condition into the area. In one specific but non-limiting implementation, with respect to the light-emission candidate present in the non-overexposure range 254, the area converter 178 may count the number of pixels that satisfies the second color condition when the relative distance is equal to or greater than 0 (zero) meter but less than 40 meters, count the number of pixels that satisfies the third color condition when the relative distance is equal to or greater than 40 meters but less than 60 meters, count the number of pixels that satisfies the fourth color condition when the relative distance is equal to or greater than 60 meters but less than 80 meters, and count the number of pixels that satisfies the fifth color condition when the relative distance is equal to or greater than 80 meters. With respect to the light-emission candidate present in the overexposure range 252, the area converter 178 may count the number of pixels that satisfies the second color condition regardless of the relative distance.

Following the counting, the area converter 178 may convert the counted number of pixels into the area, based on the inverse function illustrated in FIG. 12 (i.e., division of the relative distance between the own vehicle 1 and the preceding vehicle by the number of pixels in FIG. 12). This reduces the variation in the size of the three-dimensional object, making it possible for the later-described lamp determiner 180 to determine the lighted stop lamp with high accuracy by comparing the thus-converted area with the lighted-state determination thresholds.

Figure 13:
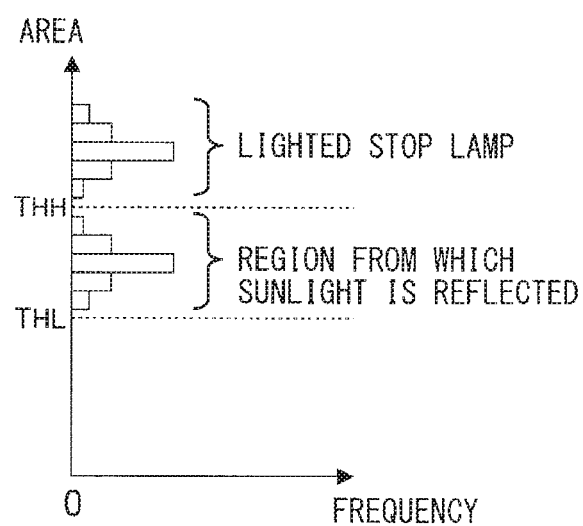
FIG. 13 is a histogram that statistically describes the lighted-state determination thresholds.

FIG. 13 is a histogram that statistically describes the lighted-state determination thresholds. More specifically, FIG. 13 describes statistics taken of area of a section from which the sunlight is reflected and area of the lighted stop lamp, with a horizontal axis denoting a frequency. As described in FIG. 13, it is statistically known that the area of the section from which the sunlight is reflected is mostly smaller than the area of the lighted stop lamp.

In this implementation, therefore, the lighted-state determination threshold THH may be statistically predetermined and stored in the memory 152. The lighted-state determination threshold THH may distinguish the area of the section from which the sunlight is reflected and the area of the lighted stop lamp. Here, one plausible method may be to determine whether or not the light-emission source candidate is the lighted stop lamp, with respect to all the light-emission source candidates, with use of solely the lighted-state determination threshold THH. But the light-emission source candidates determined as below the lighted-state determination threshold THH may include not a few lighted stop lamps. Accordingly, the lighted-state determination threshold THL may be also statistically predetermined and stored in the memory 152. The lighted-state determination threshold THL may be a value that is lower than the lighted-state determination threshold THH and smaller than the area of the lighted stop lamp. The lighted-state determination threshold THH may be applied to the light-emission source candidate in the overexposure range 252 in which the color value is considered to be increased due to the reflection of the sunlight, while the lighted-state determination threshold THL may be applied to the light-emission source candidate in the non-overexposure range 254 in which the reflection of the sunlight is considered not to occur.

In one specific but non-limiting implementation, the lamp determiner 180 may provisionally determine that the light-emission source candidate present in the non-overexposure range 254 is the lighted stop lamp, when the area of the light-emission source candidate present in the non-overexposure range 254 is equal to or greater than the lighted-state determination threshold THL. Meanwhile, the lamp determiner 180 may provisionally determine that the light-emission source candidate present in the overexposure range 252 is the lighted stop lamp, solely in a case in which the area of the light-emission source candidate present in the overexposure range 252 is equal to or greater than the lighted-state determination threshold THH.

The lamp determiner 180 may further make a determination as to whether the light-emission source candidate provisionally-determined as the lighted stop lamp alone satisfies conditions of, without limitation, a height range of "0.3 meters to 2.0 meters", a width range in the horizontal distance of "0.05 meters to 0.2 meters", and a width range in the vertical distance of "0.05 meters to 0.2 meters". The lamp determiner 180 may also make a determination as to whether a combination of the light-emission source candidates as a pair satisfies conditions of, without limitation, a difference in a horizontal distance of "1.4 meters to 1.9 meters", a difference in a vertical distance of "0.3 meters or less", and an area ratio of "50% to 200%". The lamp determiner 180 may identify the pair of light-emission source candidates that satisfy the foregoing example conditions as the lighted stop lamps. Such a configuration that identifies the light-emission source candidates as the stop lamps only when those light-emission source candidates are located at their respective positions corresponding to relevant positions of a vehicle makes it possible to prevent the light-emission source candidate from being erroneously recognized as the stop lamp. In other words, for example, it is possible to prevent the light-emission source candidate, lighted solely at the brightness equal to the brightness of the stop lamp, such as, but not limited to, a rear fog lamp, from being erroneously recognized as the stop lamp.

After determining the lighted stop lamp in this manner, the lamp determiner 180 may associate the determined stop lamp with the "vehicle" identified based on the first image by the first exposure mode described above.

As described in the foregoing, with respect to the light-emission source candidate in the overexposure range 252 in the vicinity of the overexposed light-emission source, the vehicle exterior environment recognition apparatus 120 may count the number of pixels, with use of the color condition equal to or higher than the color condition with respect to the light-emission source candidate in the non-overexposure range 254, even when the color value of the light-emission source in the overexposure range 252 is increased due to the reflection of the sunlight. Hence, it is possible to derive the area in consideration of the influence by the reflection of the sunlight, and to determine the lighted stop lamp accurately. Note that, with respect to the light-emission source candidate in the overexposure range 252, the number of pixels may be counted with use of the color condition higher than the color condition used for the light-emission source candidate in the non-overexposure range 254.

Further, with respect to the light-emission source candidate in the overexposure range 252 in the vicinity of the overexposed light-emission source, the vehicle exterior environment recognition apparatus 120 may make the determination as to whether the light-emission source candidate is the lighted stop lamp, with use of the different lighted-state determination threshold THH that is higher than that of the light-emission source candidate in the non-overexposure range 254, even when the color value of the light-emission source candidate in the overexposure range 252 is increased due to the reflection of the sunlight. Hence, it is possible to make a determination in consideration of the influence of the reflection of the sunlight, and to determine the lighted stop lamp more accurately.

The vehicle exterior environment recognition apparatus 120 may also eliminate the necessity to continuously detect a change in luminance of the stop lamp after the preceding vehicle is identified. Hence, it is possible to determine the lighted stop lamp promptly.

[Flow of Vehicle Exterior Environment Recognition Process]

A description is given next of an example flow of a vehicle exterior environment recognition process that is to be executed by the central controller 154. The vehicle exterior environment recognition process may include the image process, the vehicle identifying process, the light-emission source candidate identifying process, the overexposure range setting process, and the lamp determination process as described above.

Figure 14:
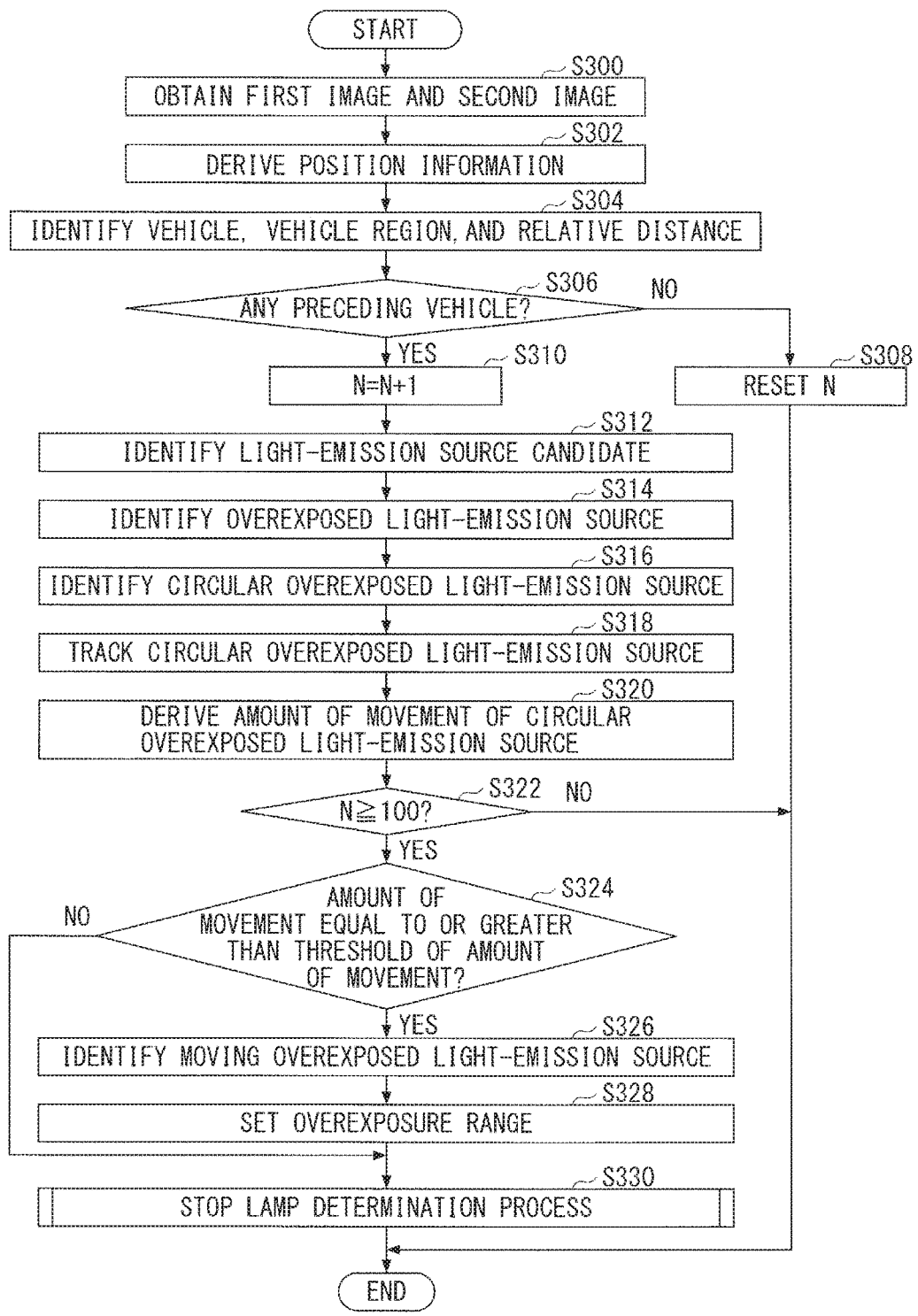
FIG. 14 is a flowchart illustrating an example of a vehicle exterior environment recognition process.
Figure 15:
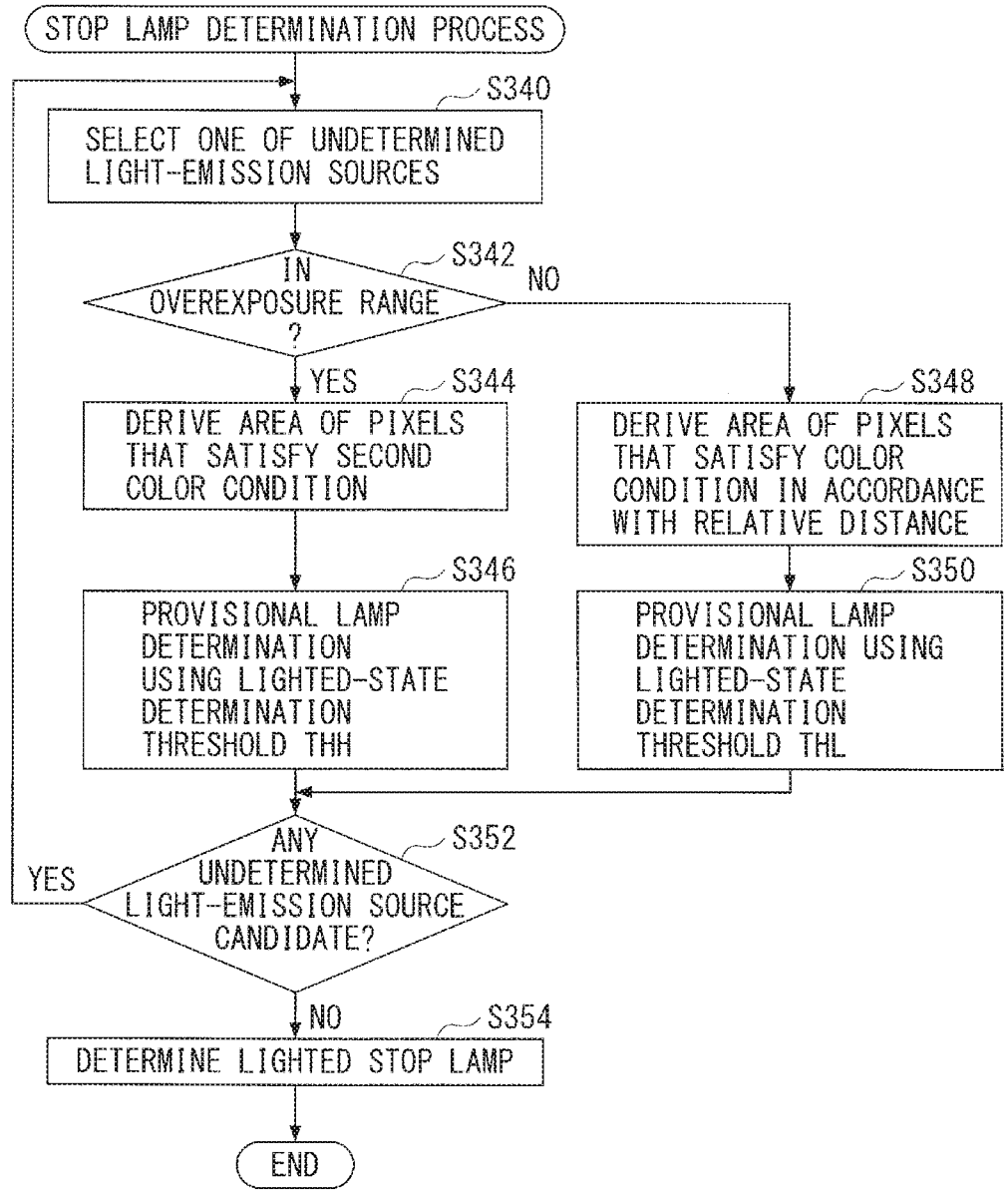
FIG. 15 is a flowchart illustrating an example of a stop lamp determination process.

FIG. 14 is a flowchart illustrating an example flow of the vehicle exterior environment recognition process. FIG. 15 is a flowchart illustrating an example flow of a stop lamp determination process. Referring to FIG. 14, the image processing module 160 may first obtain the first image captured based on the first exposure mode and the second image captured based on the second exposure mode from the image-capturing units 110 (S300). The image processing module 160 may thereafter derive the parallax from the obtained images, and the position information deriving unit 162 may derive the three-dimensional position information corresponding to each part of a three-dimensional object, based on the derived parallax (S302). The vehicle identifier 164 may thereafter identify the vehicle and the vehicle region from the three-dimensional objects each grouped based on the three-dimensional position information, and identify the relative position (e.g., the relative distance) between the own vehicle 1 and the preceding vehicle (S304).

The candidate identifier 166 may thereafter determine whether any preceding vehicle has been identified (S306). When no preceding vehicle has been identified (NO in S306), the candidate identifier 166 may reset the frame number N of the second images obtained after the identification of the preceding vehicle (S308), and finish the relevant vehicle exterior environment recognition process.

Meanwhile, when the preceding vehicle has been identified (YES in S306), the candidate identifier 166 may increment the frame number N by one (1) (S310), and thereafter identify, as the light-emission source candidate, the group of pixels in which the color values satisfy the fifth color condition (S312). The group of pixels here constitutes the second image. Thereafter, the overexposure identifier 168 may identify, as the overexposed light-emission source, the group of pixels in which the color values are equal to or greater than the overexposure threshold (S314).

Thereafter, the shape determiner 170 may derive the degree of circularity of the overexposed light-emission source identified by the overexposure identifier 168. The shape determiner 170 may identify, as the circular overexposed light-emission source, the overexposed light-emission source whose degree of circularity thus derived is equal to or greater than the circularity threshold attributed to the reflection from the rear window (S316).

Thereafter, the movement amount deriving unit 172 may track the circular overexposed light-emission source (S318) by associating the circular overexposed light-emission source in the second image obtained last time or last time but one, with the circular overexposed light-emission source in the second image obtained this time. Thus, the movement amount deriving unit 172 may derive the amount of movement of the tracked circular overexposed light-emission source (S320).

Thereafter, the moving overexposure identifier 174 may determine whether the frame number N is equal to or greater than 100 (S322). When the frame number N is smaller than 100 (NO in S322), the moving overexposure identifier 174 may finish the relevant vehicle exterior environment recognition process.

Meanwhile, when the frame number N is equal to or greater than 100 (YES in S322), the moving overexposure identifier 174 may determine whether the amount of movement of the circular overexposed light-emission source is equal to or greater than the threshold of the amount of movement (S324). When the amount of movement of the circular overexposed light-emission source is equal to or greater than the threshold of the amount of movement (YES in S324), the moving overexposure identifier 174 may identify, as the moving overexposed light-emission source, the circular overexposed light-emission source whose amount of movement is equal to or greater than the threshold of the amount of movement (S326). Thereafter, the overexposure range setting unit 176 may set the overexposure range 252 (S328). The overexposure range 252 may be a range within ±300 millimeters horizontally in the vehicle region 240, with the horizontal center of the moving overexposed light-emission source serving as the reference. Note that the overexposure range setting unit 176 may set the whole vehicle region 240 as the non-overexposure range 254, in a case in which the amount of movement of the circular overexposed light-emission source is smaller than the threshold of the amount of movement (NO in S324) and no moving overexposure light-emission source has been identified. When the moving overexposed light-emission source has been identified and the setting of the overexposure range 252 has been provided, the overexposure range setting unit 176 may set, as the non-overexposure range 254, a range, in the vehicle region 240, that is not set as the overexposure range 252.

Thereafter, the area converter 178 and the lamp determiner 180 may perform the stop lamp determination process (S330) that may involve the determination of the lighted stop lamp, and finish the relevant vehicle exterior environment recognition process. In one specific but non-limiting implementation, referring to FIG. 15, the area converter 178 may select one of the identified but undetermined light-emission source candidates (S340). The area converter 178 may determine the light-emission source candidate thus selected is present in the overexposure range 252 (S342). When the selected light-emission source candidate is present in the overexposure range 252 (YES in S342), the area converter 178 may count the number of pixels in which the color values satisfy the second color condition, and convert the number of pixels to the area, based on the relative distance from the preceding vehicle (S344). Thereafter, the lamp determiner 180 may compare the area thus converted with the lighted-state determination threshold THH, to provisionally determine whether or not the light-emission source candidate is the lighted stop lamp (S346).

Meanwhile, when the selected light-emission source candidate is not present in the overexposure range 252, i.e., when the selected light-emission source candidate is present in the non-overexposure range 254 (NO in S342), the area converter 178 may count the number of pixels in which the color values satisfy the color condition in accordance with the relative distance (e.g., any one of the second to fifth color conditions), and convert the number of pixels to the area, based on the relative distance from the preceding vehicle (S348). Thereafter, the lamp determiner 180 may compare the area thus converted with the lighted-state determination threshold THL, to provisionally determine whether or not the light-emission source candidate is the lighted stop lamp (S350).

The area converter 178 may thereafter make a determination as to whether there is any undetermined light-emission source candidate (S352). When a determination is made that the undetermined light-emission source candidate is present (YES in S352), the flow may return to the process in S340. When a determination is made that there is no undetermined light-emission source candidate (NO in S352), the lamp determiner 180 may determine the light-emission source candidate, provisionally-determined as the lighted stop lamp, as the lighted stop lamp when that provisionally-determined light-emission source candidate satisfies the conditions on, for example but not limited to, the position and the size (S354). This may complete the relevant vehicle exterior environment recognition process.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in one implementation described above, with respect to the light-emission source candidate in the non-overexposure range 254 and the light-emission source candidate in the overexposure range 252, the determination is made as to whether or not the light-emission source candidate is the lighted stop lamp, with use of different color conditions and different lighted-state determination thresholds. The implementation, however, is not limited thereto. In an alternative implementation, with respect to the light-emission source candidate in the non-overexposure range 254 and the light-emission source candidate in the overexposure range 252, the determination is made as to whether or not the light-emission source candidate is the lighted stop lamp, with the same lighted-state determination threshold and the different color conditions. In another alternative implementation, with respect to the light-emission source candidate in the non-overexposure range 254 and the light-emission source candidate in the overexposure range 252, the determination is made as to whether or not the light-emission source candidate is the lighted stop lamp, with the same color condition and the different lighted-state determination thresholds.

In one implementation described above, the determination is made as to whether or not the light-emission source candidate is the lighted stop lamp, by counting the number of pixels that satisfies the color condition in accordance to the relative distance, converting the number of pixels to the area, based on the relative distance from the preceding vehicle, and comparing the area thus converted with the lighted-state determination threshold. The implementation, however, is not limited thereto. In an alternative implementation, the determination is made as to whether or not the light-emission source candidate is the lighted stop lamp, by comparing the number of pixels or the pixel area that satisfies the predetermined color condition with the lighted-state determination threshold.

In one implementation described above, the determination is made as to whether the light-emission source candidate, provisionally-determined as the lighted stop lamp, satisfies the conditions on, for example but not limited to, the position and the size, and the provisionally-determined light-emission source candidate that satisfies the conditions is determined as the lighted stop lamp. The implementation, however, is not limited thereto. In an alternative implementation, the light-emission source candidate provisionally-determined as the lighted stop lamp may be determined directly as the lighted stop lamp.

In one implementation described above, the determination is made as to whether the light-emission source candidate is the lighted stop lamp. The implementation, however, is not limited thereto. In an alternative implementation, a determination may be made as to whether the light-emission source candidate is a lighted lamp other than the stop lamp.

In one implementation described above, when the moving overexposed light-emission source is identified, the overexposure range 252 may be set within ±30 centimeters horizontally with respect to the moving overexposed light-emission source. The implementation, however, is not limited thereto. In an alternative implementation, when the moving overexposed light-emission source is identified, the overexposure range may be set within a predetermined range (e.g., ±30 centimeters) horizontally and vertically with respect to the moving overexposed light-emission source.

In one implementation described above, the shape determiner 170 may identify the moving overexposed light-emission source, by deriving the degree of circularity of the overexposed light-emission source, and deriving the amount of movement of the circular overexposed light-emission source whose degree of circularity is equal to or greater than the circularity threshold. The shape determiner 170 may, however, identify the moving overexposed light-emission source by deriving the amounts of movement of all the overexposed light-emission sources. In other words, the shape determiner 170 does not have to derive the degree of circularity of the overexposed light-emission source.

In one implementation described above, the central controller 154 may include a semiconductor integrated circuit that may have devices such as, but not limited to, the central processing unit (CPU), the ROM, and the RAM. The implementation, however, is not limited thereto. In an alternative implementation, the central controller 154 may include an integrated circuit such as, but not limited to, a field programmable gate array (FPGA) and an application specific integrated circuit (ASIC). The central controller 154 or any other controller may include one or more central processing units, one or more FPGAs, and/or one or more ASICs.

The implementation also provides a program that causes a computer to function as the vehicle exterior environment recognition apparatus 120, and a recording medium that stores the program. The recording medium is computer readable. Non-limiting examples of the recording medium may include a flexible disk, a magneto-optical disk, DRAM, SRAM, ROM, NVRAM, CD, DVD (Registered Trademark), and BD (Registered Trademark). As used herein, the term "program" may refer to a data processor written in any language and any description method.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

The invention claimed is:
1. A vehicle exterior environment recognition apparatus, comprising
   a computer configured to serve as:
      a vehicle identifier that identifies, from each of images captured continuously by an image-capturing unit, a preceding vehicle and a vehicle region occupied by the preceding vehicle;
      a candidate identifier that identifies, as a light-emission source candidate, a candidate determinable as a light-emission source in the identified vehicle region;

an overexposure identifier that identifies, as an overexposed light-emission source, a section that satisfies a predetermined condition of overexposure in the identified vehicle region;

a movement amount deriving unit that derives an amount of movement, in a predetermined period of time, of the overexposed light-emission source with respect to the vehicle region;

a moving overexposure identifier that identifies the overexposed light-emission source as a moving overexposed light-emission source, when the amount of movement of the overexposed light-emission source is equal to or greater than a predetermined threshold of the amount of movement;

an overexposure range setting unit that sets, as an overexposure range, a predetermined range with respect to the moving overexposed light-emission source; and a lamp determiner that determines whether the identified light-emission source candidate is a lighted lamp, based on different conditions between the light-emission source candidate present in the overexposure range and the light-emission source candidate present in a range other than the overexposure range.

2. The vehicle exterior environment recognition apparatus according to claim 1, wherein the lamp determiner determines whether the identified light-emission source candidate present in the range other than the overexposure range is the lighted lamp, based on one of the number of pixels and area of pixels that satisfy a color condition of predetermined intensity, and the lamp determiner determines whether the identified light-emission source candidate present in the overexposure range is the lighted lamp, based on one of the number of pixels and area of pixels that satisfy a color condition of greater intensity than the color condition of the predetermined intensity.

3. The vehicle exterior environment recognition apparatus according to claim 1, further comprising a shape determiner that derives a degree of circularity of the overexposed light-emission source identified by the overexposure identifier, and extracts the overexposed light-emission source having the derived degree of circularity equal to or greater than a predetermined circularity threshold, wherein the movement amount deriving unit derives the amount of movement of the overexposed light-emission source extracted by the shape determiner.

4. The vehicle exterior environment recognition apparatus according to claim 2, further comprising a shape determiner that derives a degree of circularity of the overexposed light-emission source identified by the overexposure identifier, and extracts the overexposed light-emission source having the derived degree of circularity equal to or greater than a predetermined circularity threshold, wherein the movement amount deriving unit derives the amount of movement of the overexposed light-emission source extracted by the shape determiner.

5. The vehicle exterior environment recognition apparatus according to claim 1, wherein the overexposure range setting unit sets the overexposure range that is vertically extended from the moving overexposed light-emission source serving as a center.

6. The vehicle exterior environment recognition apparatus according to claim 2, wherein the overexposure range setting unit sets the overexposure range that is vertically extended from the moving overexposed light-emission source serving as a center.

7. The vehicle exterior environment recognition apparatus according to claim 3, wherein the overexposure range setting unit sets the overexposure range that is vertically extended from the moving overexposed light-emission source serving as a center.

8. The vehicle exterior environment recognition apparatus according to claim 4, wherein the overexposure range setting unit sets the overexposure range that is vertically extended from the moving overexposed light-emission source serving as a center.

9. The vehicle exterior environment recognition apparatus according to claim 2, wherein the computer is configured to further serve as an area converter that counts, with respect to the identified light-emission source candidate present in the range other than the overexposure range, the number of pixels that satisfies the color condition of the predetermined intensity, and converts, based on a relative distance from a preceding vehicle, the counted number of pixels to area, and that counts, with respect to the identified light-emission source candidate present in the overexposure range, the number of pixels that satisfies the color condition of the greater intensity than the color condition of the predetermined intensity, and converts, based on the relative distance from the preceding vehicle, the counted number of pixels to area, and the lamp determiner determines the identified light-emission source candidate is the lighted lamp, when the converted area is equal to or greater than a predetermined lighted-state determination threshold at which a lamp of the preceding vehicle is determined as lighted.

* * * * *